United States Patent [19]

Helping

[11] Patent Number: 5,037,142
[45] Date of Patent: Aug. 6, 1991

[54] FLUID LINE SUPPORT AND CONNECTOR
[75] Inventor: James E. Helping, West Milton, Ohio
[73] Assignee: General Motors Corporation, Detroit, Mich.
[21] Appl. No.: 384,713
[22] Filed: Jul. 24, 1989
[51] Int. Cl.$^5$ ............................................. F16L 33/00
[52] U.S. Cl. ...................................... 285/256; 285/174
[58] Field of Search ................................. 285/256, 174
[56] References Cited

U.S. PATENT DOCUMENTS

| 2,300,517 | 11/1942 | Milton | 285/256 X |
| 2,453,997 | 11/1948 | MacWilliam | 285/256 |
| 2,535,460 | 12/1950 | Rotter et al. | 285/256 X |
| 2,926,029 | 2/1960 | St. Clair et al. | 285/256 |
| 2,973,975 | 3/1961 | Ramberg et al. | 285/256 X |

FOREIGN PATENT DOCUMENTS 534235  3/1941  United Kingdom ................. 285/256

Primary Examiner—Dave W. Arola
Assistant Examiner—Carol I. Bordas
Attorney, Agent, or Firm—Ernest E. Helms

[57] ABSTRACT

A connector assembly for attaching a brake hose of synthetic rubber to the disk brakes of a vehicle road wheel in which a cylindrical hose skirt of metal has a first end pocket which receives the cylindrical cup portion of a fluid transmitting metal eyelet which also has a nozzle that extends from the cup into a second end pocket of the skirt and into the fluid passage of the brake hose, a steel fluid conducting tube routed from the brakes fits into the cup portion of the eyelet and is joined in a high quantity fluid-tight manner to the eyelet cup and the skirt by a single brazing operation or by other similar joining material to provide for the improved support and optimized hydraulic connection of the hose with respect to the disk brakes.

1 Claim, 1 Drawing Sheet

FLUID LINE SUPPORT AND CONNECTOR

BRIEF DESCRIPTION OF THE DISCLOSURE

This invention relates to connectors for uniting separate fluid conducting lines and, more particularly, to a new and improved connector assembly for operatively joining a fluid conducting hose preferably of a flexible rubber-like material to a relatively rigid fluid conducting tube associated with a fluid actuated device.

BACKGROUND OF THE INVENTION

Prior to the present invention, a wide variety of connector devices have been utilized to connect tubes to hoses for conducting fluid therethrough or transmitting a hydraulic force through a column of oil contained therein. In many cases, specialized couplings are required which not only hydraulically connect adjacent tubes or pipes, hoses and other conduits in a fluid-tight manner, but also provide effective support while allowing relative movement of components and providing protection in relatively harsh environments. For example, in some hydraulic brake line constructions, the connection of the hose of rubber-like material to the metal pipe leading to the disk brake caliper utilizes a specialized cylindrical skirt which has an internal eyelet resistance-welded therein in a fluid-tight manner. This skirt is then braze welded or otherwise fixed to effect a second fluid seal to a metal connector tube that leads to the brake calipers through an attachment block or union. The hose is inserted into the other end of the skirt and the internal eyelet is inserted into the fluid passage in the hose to provide a fluid connection between the eyelet and the hose and to provide internal support for the hose when the skirt is swaged radially inward for effective gripping of the hose.

The present invention is of the category of the above-mentioned coupling, but provides a new and improved fluid connection with a minimized leak path and with a substantially direct connection of the hose and the metallic tubing leading to a hydraulically actuated device such as a disk brake caliper.

In the present invention, the eyelet is physically united with the metallic tube routed from the disk brake and directly and securely supports the end thereof with a cup portion that conforms to the tube end. This eyelet has a reduced diameter nozzle extending therefrom for insertion within the end of the brake hose which is preferably a flexible length of reinforced synthetic rubber.

The cup portion of the eyelet is press-fitted in a pocket formed in one end of the skirt and the eyelet nozzle extends through a web in the skirt along the centralized axis thereof. This provides a second cylindrical pocket for receiving the end of the hose. The tube, eyelet and skirt are metallic devices and are fastened together in a fluid-tight manner by a single brazing operation or by other suitable joining means. Accordingly, only a single connection is needed as compared to the dual brazing or welding of the prior construction so that at least one leak path is eliminated. In the present invention, the metallic tube is supported directly by a cup of the eyelet for the improved mechanical and hydraulic connection between these parts.

It is an object of the present invention to provide a new and improved connector assembly for connecting a flexible fluid conducting hose to a relatively rigid metal tube leading to a hydraulically actuated device, the assembly comprising an eyelet member which has a cup portion press-fitted into one end of a cylindrical metallic skirt and a nozzle that fits within the inner diameter of the hose fitting within the opposite end of the skirt; the skirt is attached in a fluid sealing manner to the cup and tube by a single brazing operation or by other similar fastening means.

These and other features, objects and advantages of this invention will be more apparent from the following detailed description and drawing in which:

DETAILED DESCRIPTION OF THE DRAWINGS

Figure 1:
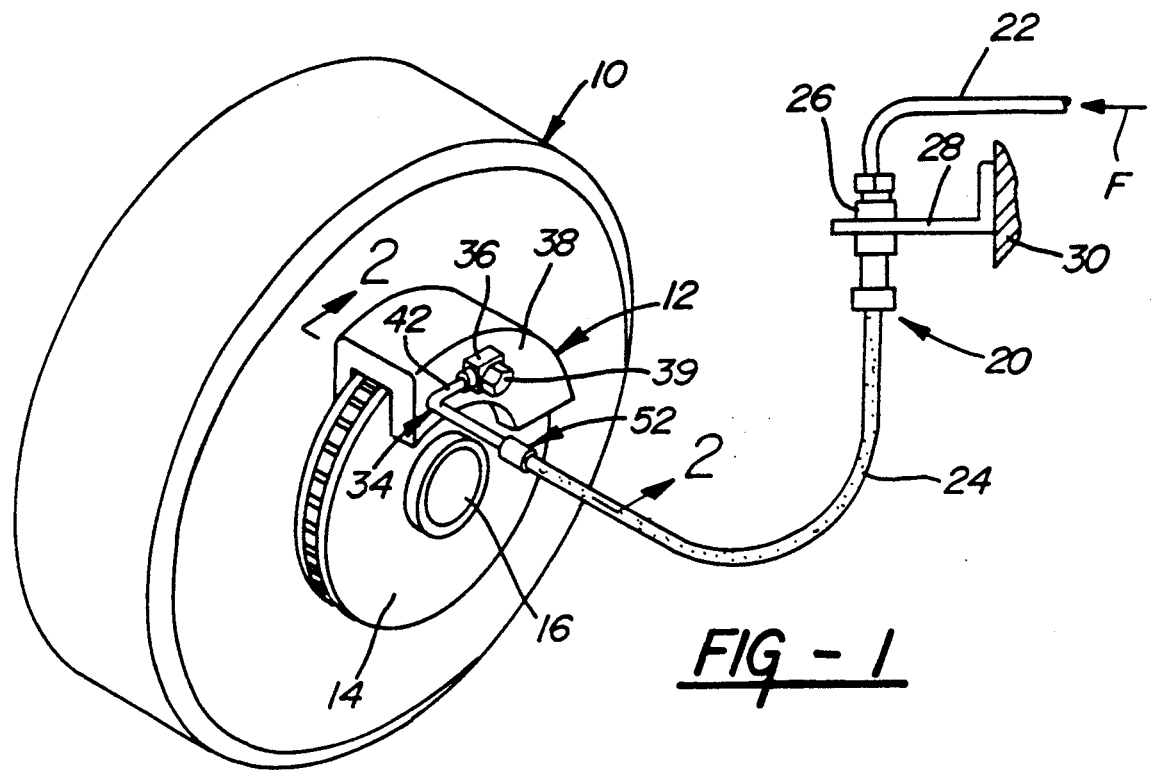
FIG. 1 is a pictorial view of an automotive vehicle road wheel and disk brake assembly with a hydraulic brake line routed thereto.
Figure 2:
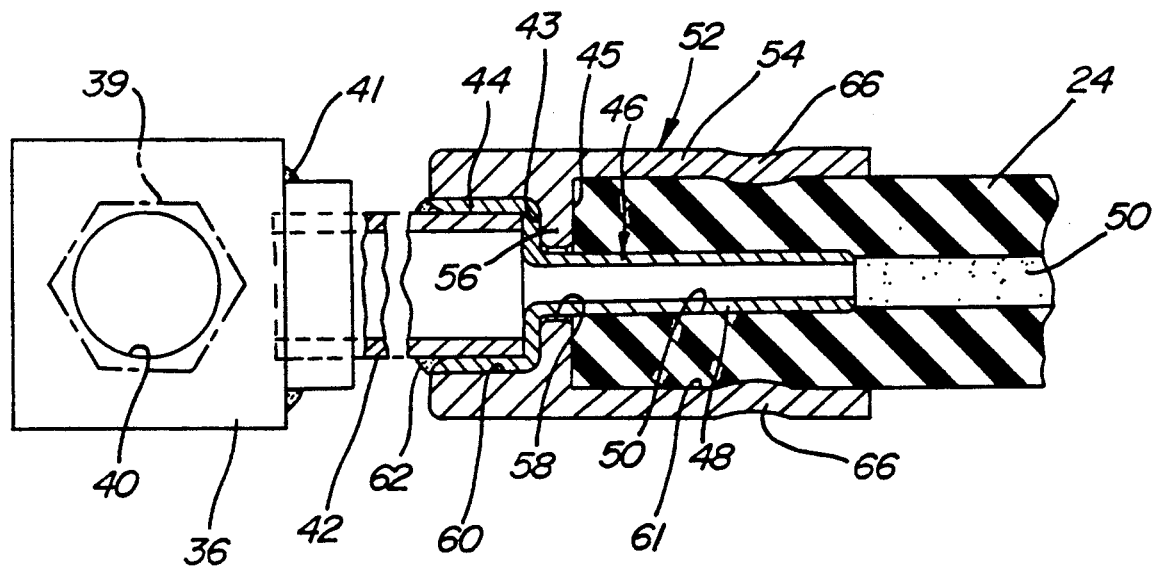
FIG. 2 is a cross-sectional view of the coupling of this invention generally along lines 2—2 of FIG. 1 and with brake connector parts shown in elevation and out of position.

Turning now in greater detail to the drawings, there is shown in FIG. 1 a road wheel assembly 10 having a disk brake 12 operatively connected thereto. The disk brake includes a conventional hydraulically operated brake caliper which is adapted to effect braking by frictionally engaging the opposite surfaces of a rotor 14 attached to hub 16 of the vehicle road wheel assembly. A brake force F, selectively applied by the vehicle operator to the brake pads of the disk brake, is transmitted by a column of oil confined within a brake line generally designated 20 routed to the caliper. This brake line includes a rigid steel tube 22 which is attached to a brake hose 24 of reinforced synthetic rubber by fitting 26 that is attached by bracket 28 to the frame 30 of the vehicle. The reinforced brake hose 24 is operatively connected to a connector assembly 34 which comprises a block-like fluid inlet union 36 secured to the caliper casing 38 by an inlet union screw 39 which extends through an opening 40 in union 36 and into threaded connection with casing 38. The screw 39 has a central passage for the brake fluid that communicates with an internal fluid passage that connects to the brake pad pistons which are not shown.

Extending from brazed connection at 41 with the inlet union 36 and forming part of the connector assembly 34 is a steel fluid conducting tube 42 which terminates in a cylindrical end portion that snugly fits into a cylindrical cup portion 44 of a tube support and connecting eyelet 46. The eyelet is a funnel-like part with an elongated fluid conducting nozzle 48 which has a diameter dimensioned to sealingly fit an inner wall of the hose 24 defining the fluid passage 50 of the hose 24 in a fluid-tight manner and to provide an internal support for the hose. With this eyelet construction, the metallic tube 42 is directly hydraulically connected to the synthetic rubber hose 24 for improved support and to minimize fluid leak paths as will be described below.

In addition to the union 36, the metallic tube 42 and eyelet 46, the connector assembly 34 importantly includes a brake hose skirt 52 which in the preferred embodiment has a metallic cylindrical body 54 with a transverse interior web 56 formed with a centralized opening 58 that is dimensioned to accommodate the nozzle 48 extending therethrough. The internal web 56 divides the skirt into two separate cylindrical pockets 60, 61 and also provides annular surfaces 43 and 45. Pocket 60 has a smaller diameter and provides a receptacle for the cup portion 44 of the eyelet 46. Preferably, the nozzle 48 is inserted and advanced through the web opening 58 as the cup is press-fitted into the pocket to form a two-piece skirt and eyelet subassembly without any welding as in the prior art construction. The tube, skirt and connector eyelet can then be joined together by an annular brazed connection as illustrated at 62 to provide a high quality, fluid-tight joint that can be readily produced in quantity with minimized rejection of assembled parts since this connection reduces the number of potential leak paths.

In addition to the small diameter pocket, the skirt 52 and the nozzle 48 of the eyelet form the large diameter cylindrical pocket 61 for receiving the end of the brake hose 24. As shown, the brake hose fits in closely into the formed cylindrical pocket 61 of the skirt so that the internal and external diameter of the brake hose are closely against the nozzle and the internal wall forming the pocket 61. With the internal support provided by the nozzle 48, the wall of the brake hose skirt along a portion of the brake hose 24 that is penetrated by the nozzle 48 can be annularly swaged or crimped such as shown a to provide a mechanically secure and fluid-tight connection between the parts.

While a preferred embodiment of this invention has been shown and described, other embodiments will become more apparent to those skilled the art. Accordingly, the scope of this invention is set forth in the following claims.

The embodiments of the invention in which an exclusive property or privilege is claimed are defined as follows:

1. A connector assembly comprising a fluid conducting metal tube, a generally cylindrical fluid conducting hose of flexible rubber-like material having a fluid passage therethrough and an end with predetermined outer and inner diameters, a metallic connector skirt for surrounding adjacent end portions of said metal tube and said hose, said skirt having a longitudinal axis and two separate cylindrical pockets formed by a dividing transverse cylindrical web, one of said pockets having a smaller diameter than the other said pocket, and said web providing opposing annular surfaces extending perpendicular to the longitudinal axis of the skirt and an eyelet for directly hydraulically interconnecting said metal tube and the hose, said eyelet having a cup portion press fitted into said connector skirt smaller diameter pocket and grounded against one of said web annular surfaces for receiving an end portion of the tube and having an elongated nozzle extending from the cup portion and cooperating therewith to define a fluid passage therethrough and being radially and inwardly spaced from and within one of said cylindrical pockets of the skirt for receiving said conducting hose, and said elongated nozzle projecting into said conducting hose closely adjacent to said inner diameter of said conducting hose and providing a support for said inner diameter of said conducting hose, and said web providing one of said annular surfaces for the abutting of said conducting hose, and annular metallic joining means connecting said tube to said cup portion and said skirt in a fluid-tight manner and said skirt being crimped to ground a portion of said conducting hose which is also penetrated by said elongated nozzle to provide a mechanically secure, fluid-tight connection.

* * * * *